(12) United States Patent  
Sullivan et al.

(10) Patent No.: US 9,296,296 B2
(45) Date of Patent: Mar. 29, 2016

(54) FRONT END ACCESSORY DRIVE BRACKET AND MOUNTING METHOD FOR AN ENGINE

(71) Applicant: Ford Global Technologies, LLC, Dearborn, MI (US)

(72) Inventors: James Parsons Sullivan, Grosse Pointe, MI (US); Burak Gullac, Istanbul (TR); Allan Kaminski, Basildon (GB); Dan D. Kirby, Dartford (GB); Ghanshyam M. Patel, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 24 days.

(21) Appl. No.: 14/198,134

(22) Filed: Mar. 5, 2014

(65) Prior Publication Data

US 2015/0251536 A1 Sep. 10, 2015

(51) Int. Cl.
| | |
|---|---|
| H02K 5/00 | (2006.01) |
| B60K 25/02 | (2006.01) |
| F02F 7/00 | (2006.01) |
| F02B 63/00 | (2006.01) |
| F16M 13/02 | (2006.01) |

(52) U.S. Cl.
CPC ............... *B60K 25/02* (2013.01); *F02B 63/00* (2013.01); *F02F 7/0068* (2013.01); *F16M 13/02* (2013.01); *H02K 5/00* (2013.01); *Y10T 29/49963* (2015.01)

(58) Field of Classification Search
CPC .................. F02B 67/00; B60K 25/02
See application file for complete search history.

(56) References Cited

U.S. PATENT DOCUMENTS

| 3,022,778 | A | * | 2/1962 | Stemen .................. 123/195 E |
| 4,023,428 | A | * | 5/1977 | Dysard ..................... 474/113 |
| 4,945,272 | A | * | 7/1990 | Ochi et al. ................. 310/91 |
| 5,914,549 | A | * | 6/1999 | Adachi et al. .............. 310/89 |
| 5,938,169 | A | * | 8/1999 | Ogawa et al. ............. 248/674 |
| 7,479,719 | B2 | * | 1/2009 | Misaki ..................... 310/85 |
| 8,511,272 | B2 | | 8/2013 | Koyama et al. |
| 8,813,309 | B2 | * | 8/2014 | Friesen et al. ............... 16/91 |
| 2013/0125856 | A1 | | 5/2013 | Itakura |

* cited by examiner

*Primary Examiner* — Shin Kim
(74) *Attorney, Agent, or Firm* — Julia Voutyras; Alleman Hall McCoy Russell & Tuttle LLP

(57) ABSTRACT

Methods and systems are provided for a bracket and surrounding structure for mounting a front end accessory drive component, such as an alternator, to an engine. Hanging heavy components on brackets may be dangerous and difficult for human operators as well as violate assembly standards. To securely hold the component to the engine in order to withstand vibrations and to protect the operator, an open bracket with a curved lip and surrounding support structure is used to mount the component to the engine.

19 Claims, 10 Drawing Sheets

FRONT END ACCESSORY DRIVE BRACKET AND MOUNTING METHOD FOR AN ENGINE

FIELD

The present application relates generally to systems and methods for safe mounting of auxiliary components to the outside of an internal combustion engine.

SUMMARY/BACKGROUND

A vehicle engine may be capable of mounting auxiliary or peripheral parts, such as front end accessory drive devices located at the front of the engine and on a main body of the engine. A drive pulley may be coupled to a crankshaft of the engine and further coupled to the auxiliary devices through a system of belts and auxiliary pulleys, forming a system that provides power to the auxiliary devices via the crankshaft. For example, the auxiliary components may include an alternator for charging a battery, a water pump for supplying cooling water to the engine and other devices, a thermostat coupled to the water pump, an air conditioning compressor, and an oil pump coupled to a power steering system.

The parts described above may be mounted onto an auxiliary parts structure, or front end accessory drive (FEAD) structure, which is then mounted to the engine. During manufacturing of the vehicle and upon near completion of the engine, the auxiliary parts may be attached to the auxiliary parts structure as the structure is already fixed to the engine. Human operators may be required to attach the auxiliary parts to the structure. As an example, a component such as the alternator may be attached to the structure at two brackets that are part of the structure. The alternator may be fixed to the structure via bolts that go through holes located on both the alternator and the brackets. The geometry and position of the brackets may at least partially determine the way in which the alternator is attached to the brackets and how the weight of the alternator is carried by the structure. A safe method for mounting the alternator (and other auxiliary components) is desired as well as a bracket design that enables a secure fit between the alternator and structure.

In one bracket design for an alternator, shown by Koyama et al. in U.S. Pat. No. 8,511,272, two pieces (brackets) are used to position the alternator in place. A lower bracket assuming the shape of a horizontal groove is provided for supporting the weight of the alternator. A shank of a bolt is inserted through mounting pieces of the alternator and the shank is slid into the horizontal groove and restrained from moving. At this point the weight of the alternator is borne by the horizontal groove and the alternator is then turned about an axis of the bolt so that a fixing boss of the alternator is attached to a fixing portion via another bolt. The fixing portion is located in a more vertical direction (against gravity) than the horizontal groove.

However, the inventors herein have identified potential issues with the approach of U.S. Pat. No. 8,511,272. During installation of the alternator in the mounting structure, upon positioning the alternator in the horizontal groove, a human operator must manually pivot the alternator in a generally upwards motion against gravity and hold the alternator in place to connect the fixing boss to the fixing portion of the cylinder block. Furthermore, the operator must ensure the holes of the fixing portion and fixing boss are aligned to allow the second bolt to slide through both pieces. As the horizontal groove is located below the fixing portion, an operator may have to manipulate the alternator against gravity with one hand while manipulating the bolts with the other hand. This fixing structure and method may prove difficult and unsafe for an operator. Additionally, the inventors herein have recognized that a mounting system and method is needed that conforms to assembly standards that may exist in many manufacturing settings. These standards may include stipulations that auxiliary components must have temporary retention features so the operator can drive the fasteners without holding the component in place.

Thus in one example, the above issued may be at least partially addressed by a vehicle engine mounting system, comprising: a component with two upper flanges and two lower flanges; an upper bracket comprising a semi-circular groove and a shaft-wise opening; a lower bracket comprising a semi-circular groove and a shaft-wise opening with a closed portion, the lower bracket located vertically below the upper bracket; a first connector inserted through the two upper flanges and the upper bracket; and a second connector inserted through the two lower flanges and the lower bracket. In this way, the human operator may manipulate the bolts or other fasteners while not simultaneously lifting or holding the alternator in place, as described below.

For example, an operator may first insert a first bolt through the two upper flanges of the component (such as an alternator or compressor) while the component is on a stable surface. Then, while the bolt is spanning the two upper flanges, the operator may hang the first bolt on the upper bracket comprising a semi-circular groove and a shaft-wise opening, the bracket being attached to the engine, and let the bracket support the weight of the component. The operator may then pivot the component to align with the lower bracket and insert a second bolt through the two lower flanges of the component. During this process, the operator does not need to simultaneously insert and/or tighten the bolts while holding the weight of the component.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
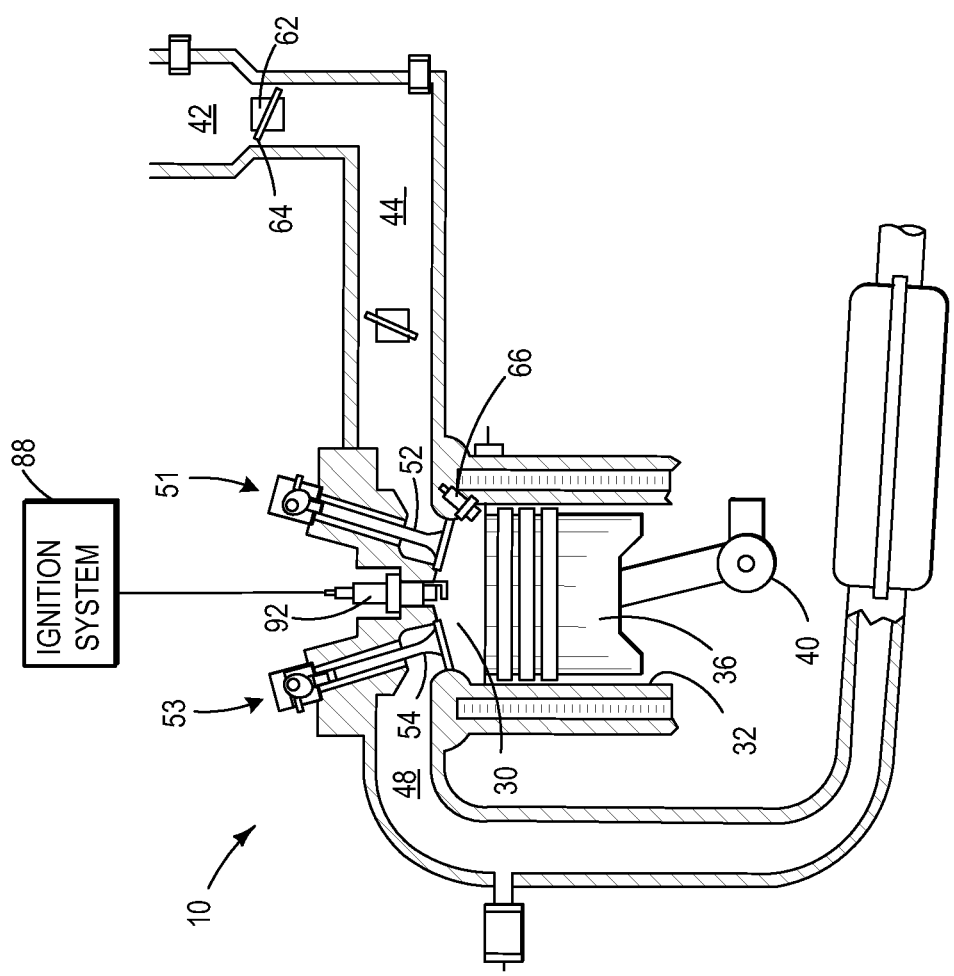
FIG. 1 shows a schematic diagram of an example internal combustion engine.
Figure 2:
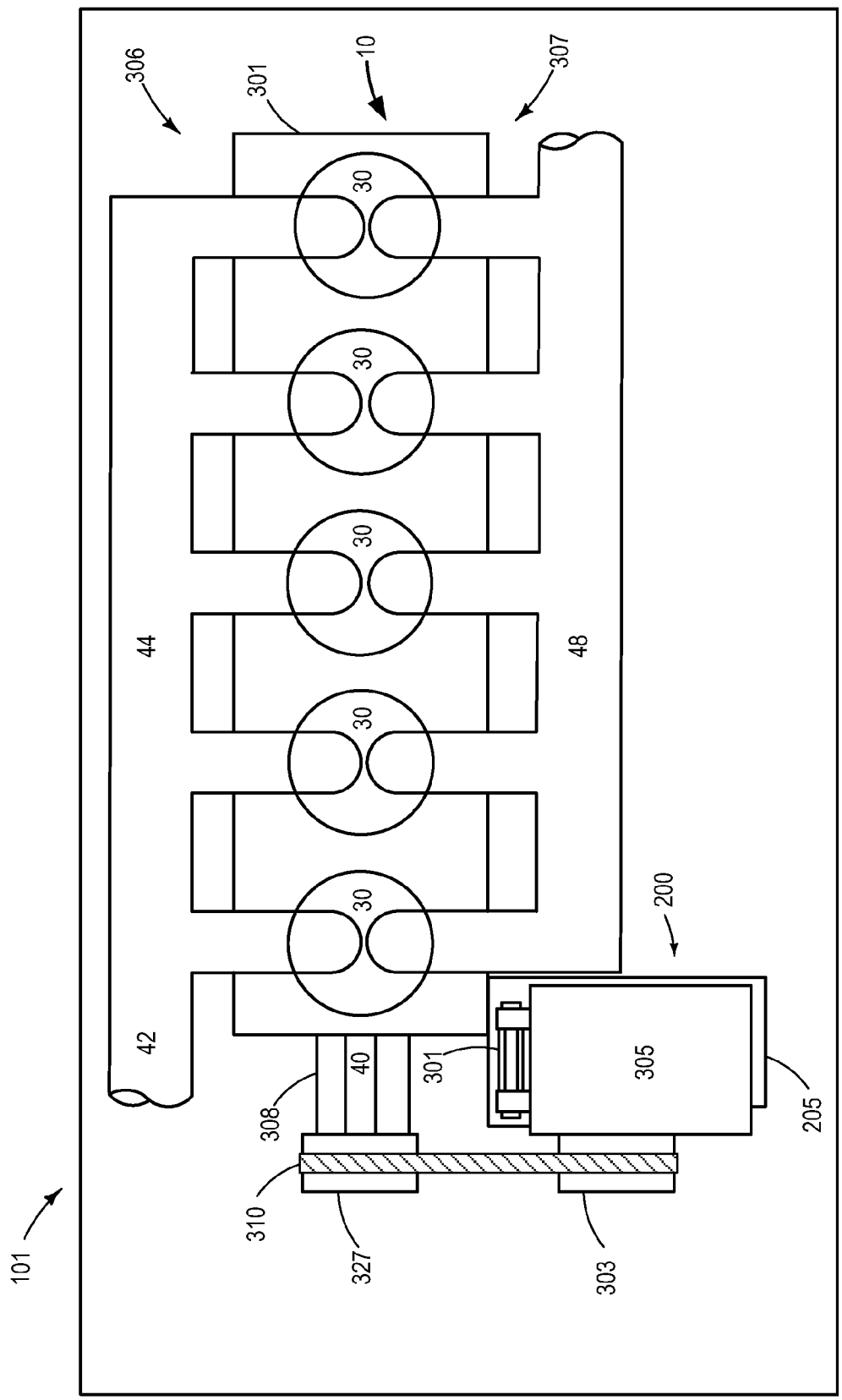
FIG. 2 shows a schematic diagram of a front end accessory drive structure coupled to an engine.
Figure 4:
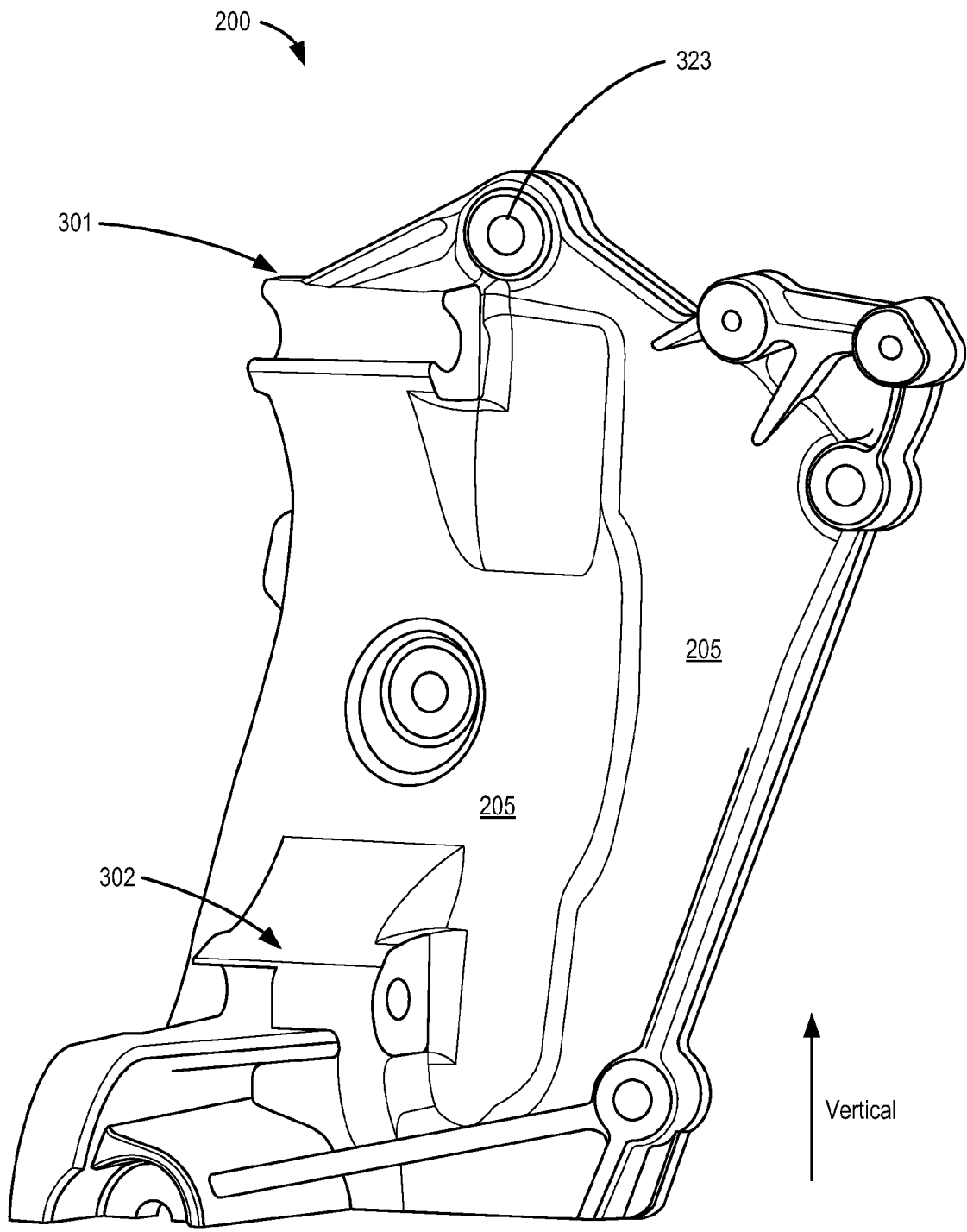
FIG. 4 illustrates the alternator mount of FIG. 3 without the alternator attached.
Figure 5:
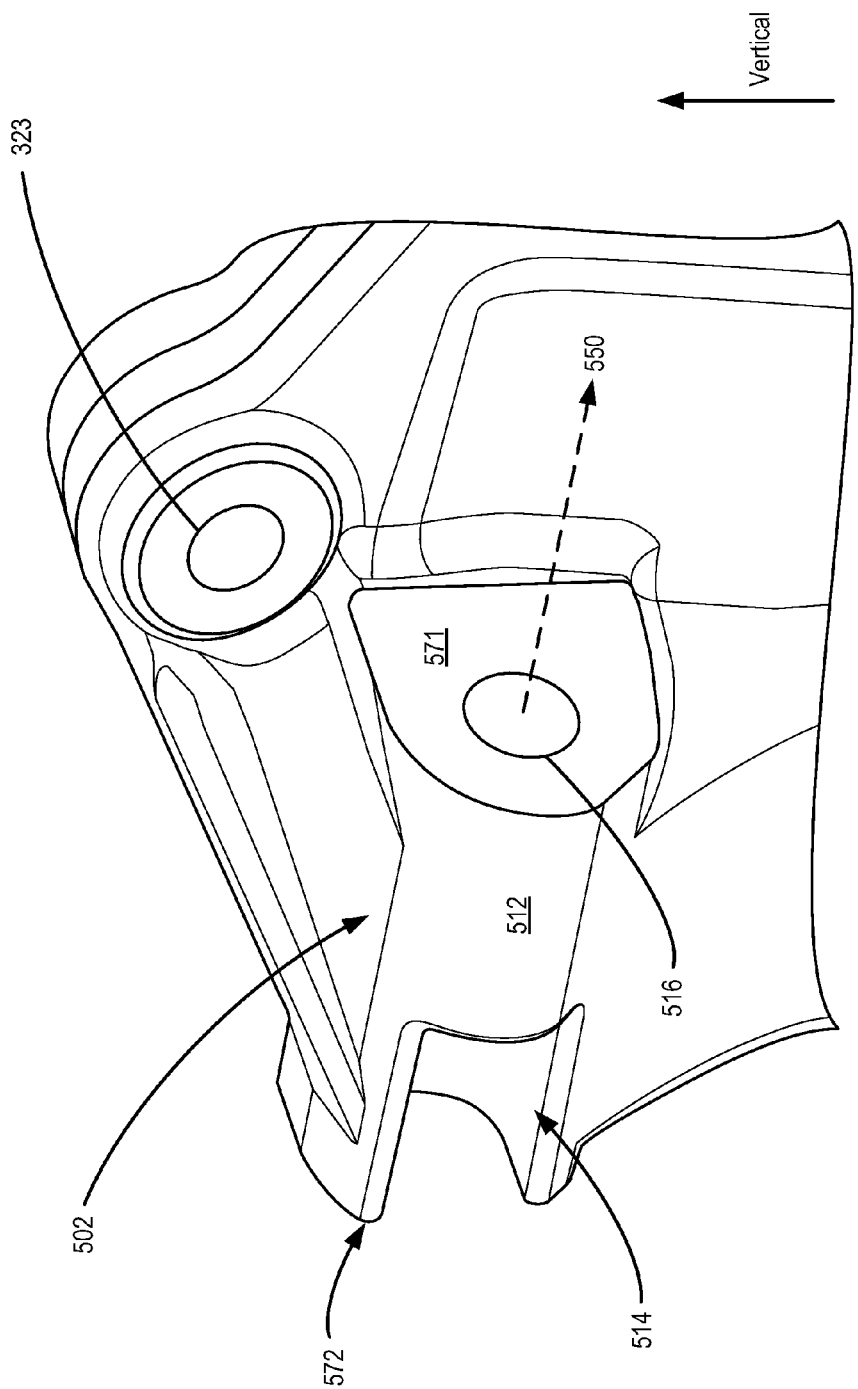
FIG. 5 shows a closed bracket as it is positioned on an alternator mount.
Figure 6A:
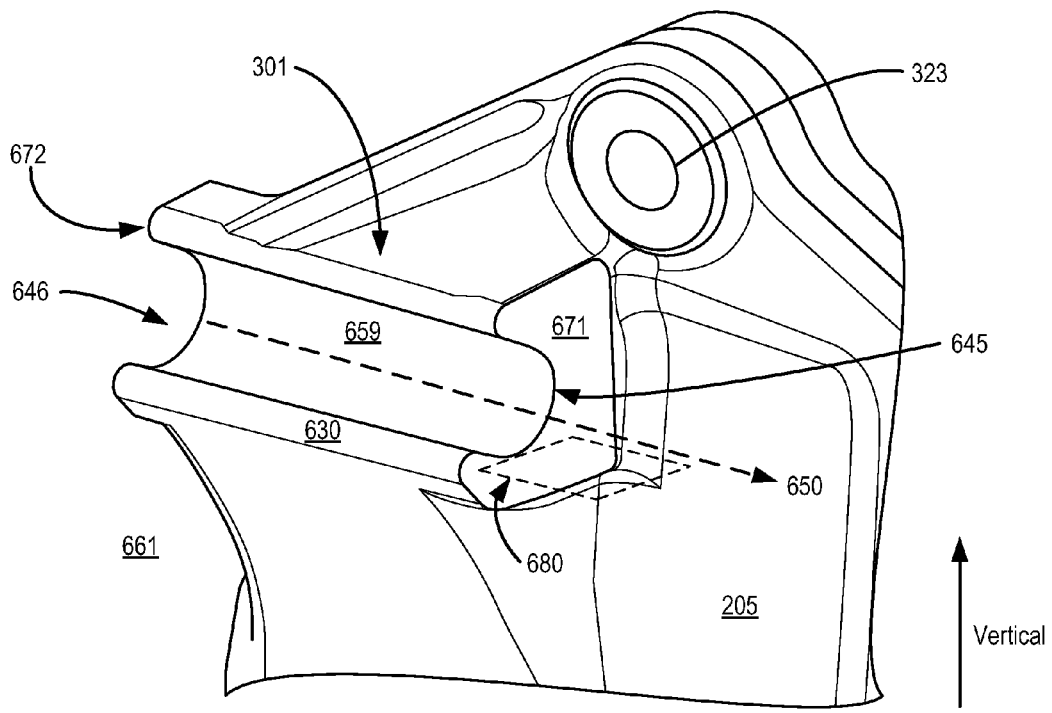
FIG. 6A shows an open bracket as it is positioned on an alternator mount.
Figure 6B:
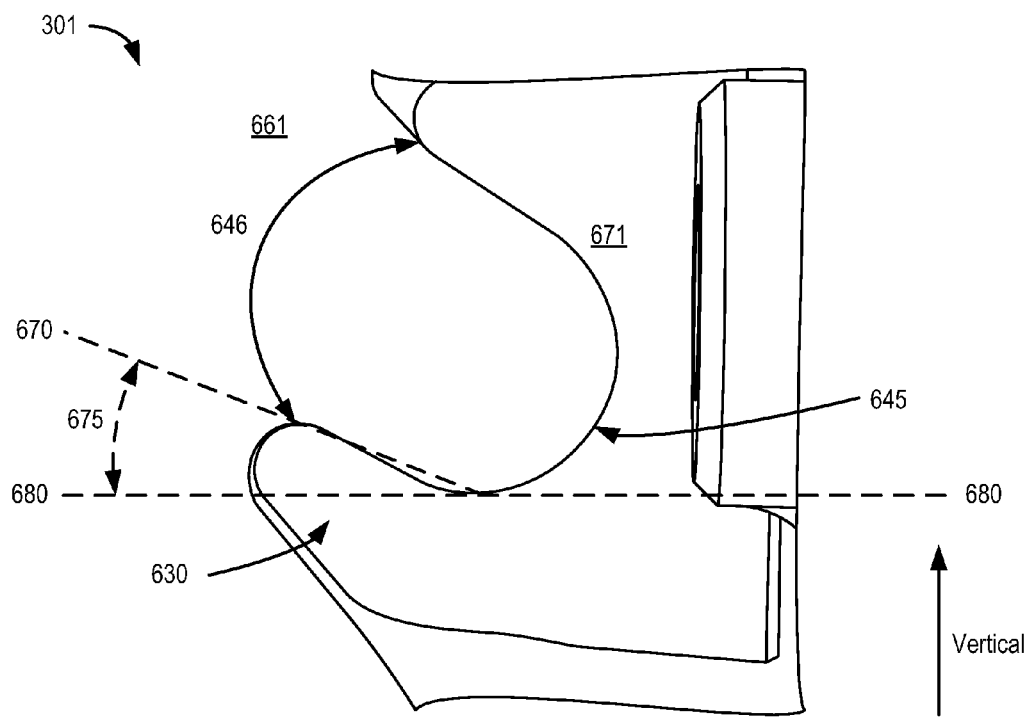
FIG. 6B shows the open bracket of FIG. 6A from a front view.
Figure 7A:
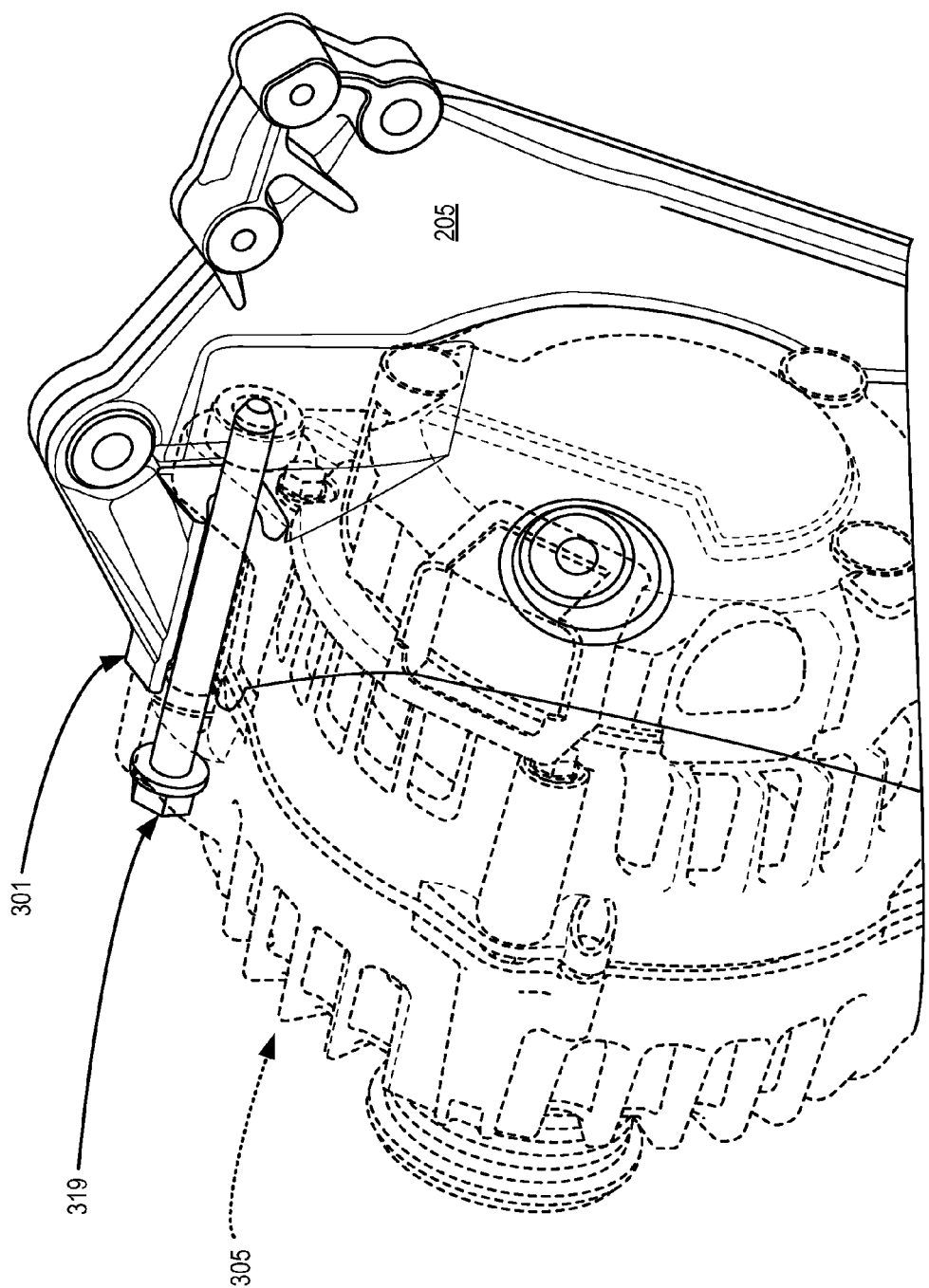
FIGS. 7A-7C illustrates a method for mounting an alternator on brackets attached to an alternator mount.
Figure 7B:
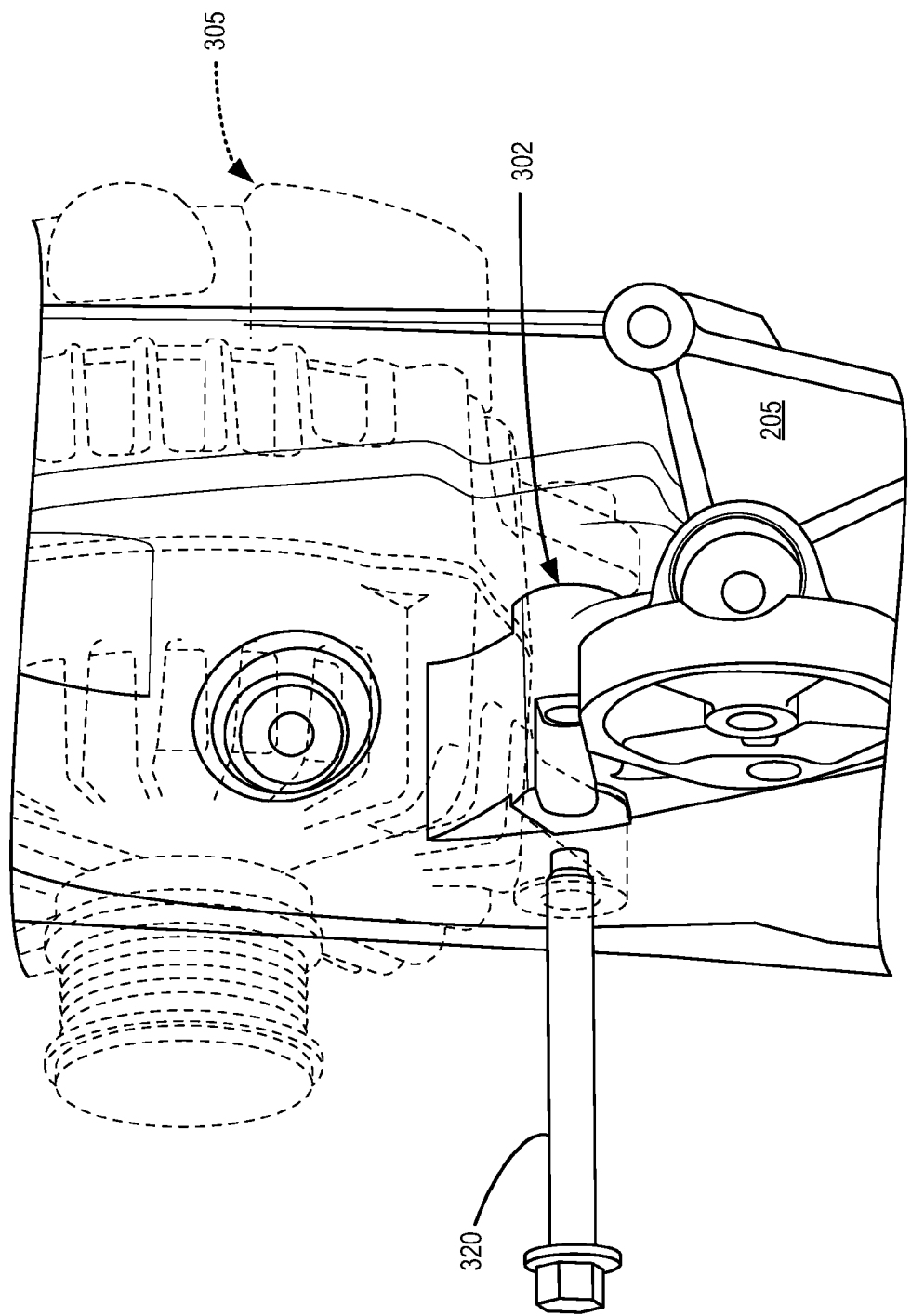
Figure 7C:
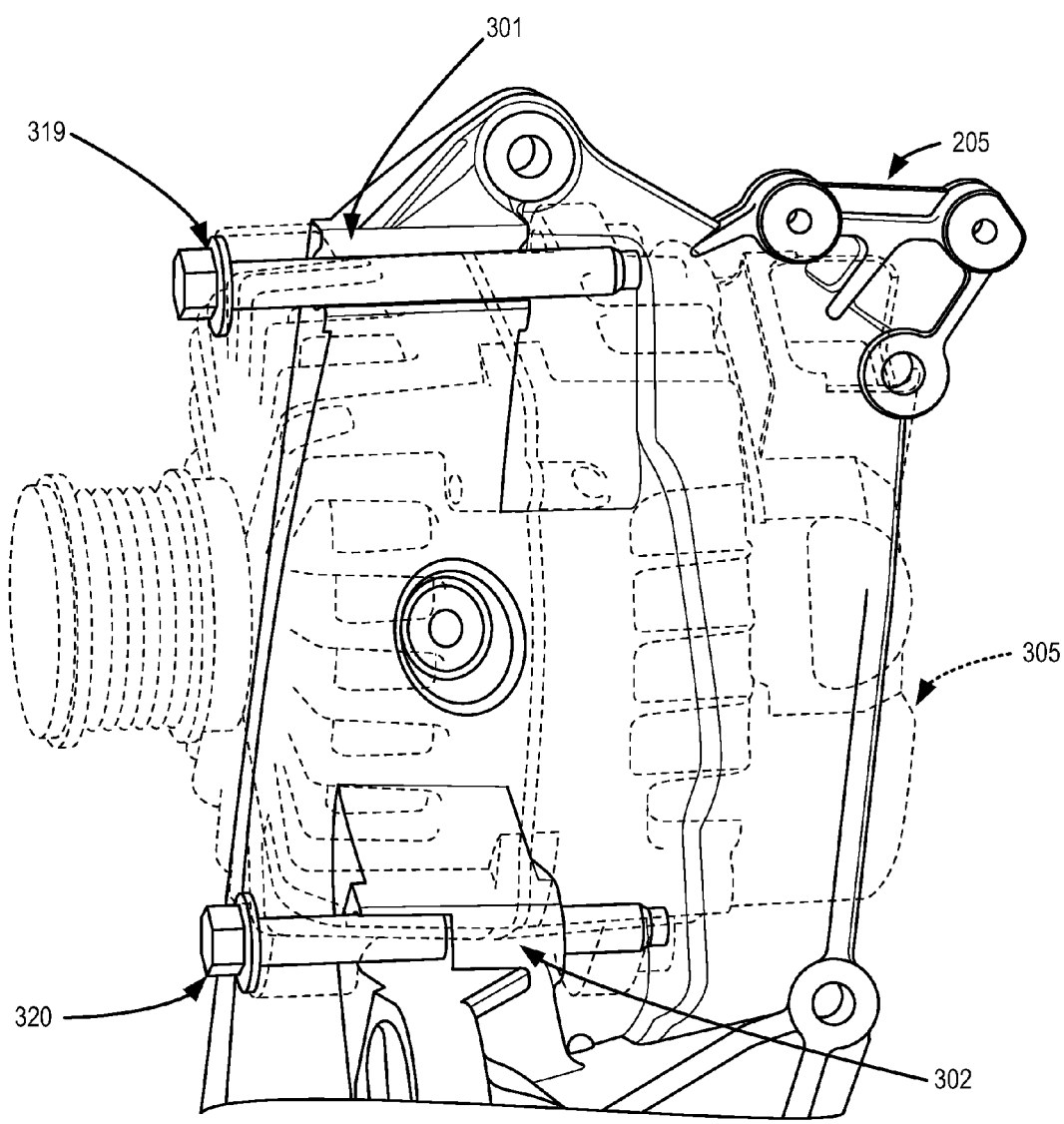

The following detailed description provides an example engine system and the proposed bracket design and system for mounting an alternator or other auxiliary component to. Furthermore, mounting methods are provided for attaching the alternator to a support structure of the engine. An example embodiment of one cylinder in a multi-cylinder internal combustion engine is shown in FIG. 1 while FIG. 2 depicts a front end accessory drive (FEAD) structure to an engine such as the engine of FIG. 1. An upper portion of the FEAD structure is shown in detail in FIG. 2 with the alternator attached. FIG. 4 shows the same portion of the FEAD structure but without the alternator to provide a better view of the mounting brackets. FIG. 5 illustrates a closed design for a bracket while FIGS. 6A-6B shows an open design for a bracket from different angles. Finally, a method for mounting the alternator to the upper portion, or alternator mount, of the FEAD structure is shown in FIGS. 7A-7C while a flow chart of the same process is displayed in FIG. 8. It is noted that FIGS. 3-7C are drawn to scale, although other relative dimensions may be used, if desired. Furthermore, it is understood that although throughout the present disclosure an alternator is the component attached to the upper and lower brackets, other auxiliary FEAD components may be mounted to the FEAD structure. These components may include a water pump, air conditioning compressor, or a power steering pump.

The following description relates to systems for a vehicle engine including a plurality of accessory devices mounted to a support structure coupled to the engine and driven by a drive loop coupled to the crankshaft of the engine.

Referring to FIG. 1, it includes a schematic diagram showing one cylinder of multi-cylinder internal combustion engine 10. Engine 10 may be controlled at least partially by a control system (not shown) and by input from a vehicle operator (not shown), for example.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. As described in more detail below, crankshaft 40 may be coupled to an engine drive system via a chain, wherein a chain guide, at least part, maintains tension in the chain via a tension adjustment mechanism.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. As described in more detail below, cam actuation systems 51 and 53 may be coupled to a drive system via a chain, wherein a chain guide, at least part, maintains tension in the chain via a tension adjustment mechanism.

Fuel injector 66 is shown coupled directly to combustion cylinder 30 for injecting fuel directly therein in proportion to a pulse width signal received from a controller via an electronic driver, for example. In this manner, fuel injector 66 provides what is known as direct injection of fuel into combustion cylinder 30. The fuel injector may be mounted on the side of the combustion cylinder or on the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64 configured for electronic throttle control (ETC), which is provided as one non-limiting example. In this manner, throttle 62 may be operated to vary the intake air provided to combustion cylinder 30 among other engine combustion cylinders. Ignition system 88 may provide an ignition spark to combustion chamber 30 via spark plug 92 in response to a controller.

As described above, FIG. 1 shows only one cylinder of a multi-cylinder engine, and each cylinder may similarly include its own set of intake/exhaust valves, fuel injector, ignition system, etc. During operation, the multi-cylinder engine may undergo a four stroke cycle wherein the actuation of the crankshaft and camshafts are synchronized by an engine drive system, as described below. Further, the engine drive system may include various other accessory drives coupled to the engine drive system via one or more loops, including chains, belts, bands, etc. For example, an oil pump, balance shaft, fan, etc. may be driven by the disclosed engine drive system.

It is noted here that engine 10 may be either a gasoline or diesel engine. As shown in FIG. 1, engine 10 may consume gasoline as its fuel, but in alternative embodiments, diesel may be the consumed fuel. In the case of a diesel engine, spark plug 92 may be removed from FIG. 1 and direct fuel injector 66 may be moved to the top of cylinder 30 where spark plug 92 was formerly positioned. Furthermore, other components of FIG. 1 may be added, changed, and/or removed to modify engine 10 to a particular system. For example, a glow plug (not shown) may be included in the diesel engine embodiment to provide heat for cold starting the engine. As explained in more detail below, diesel engines may produce more noise and harsher vibrations than gasoline engines, and therefore require more robust and durable structures.

FIG. 2 shows a schematic view of a front end accessory drive (FEAD) support structure 200 coupled to engine 10 in accordance with the present disclosure. All components shown in FIG. 2 are contained within engine compartment 101. Engine compartment 101 may include cylinder head 301, front end accessory support structure 200, crankshaft 40, crankshaft housing 308, intake manifold 44, exhaust manifold 48, alternator 305, and additional components.

Cylinder head 301 may be coupled to intake manifold 44 which draws air from intake passage 42 and into cylinders 30 through a plurality of intake ports and intake valves. Cylinders 30 may be further coupled to an exhaust manifold 48, which may be located internally within cylinder head 301 or externally. Cylinders 30 may export exhaust gas through a plurality of exhaust ports and exhaust valves through exhaust manifold 48. In FIG. 2, cylinder head 301 is shown comprising 5 cylinders in a straight line orientation (it will be appreciated that this orientation may be referred to as an Inline-5 or I-5 cylinder bank). In other examples, cylinder head 301 may comprise an alternate number of cylinders, for example 4 cylinders, and may adopt a V-type or other conformation. For the inline orientation shown in FIG. 2, the side of the cylinder head adjacent to the intake manifold may be designated as the intake side 306, and the side of the cylinder head adjacent to the exhaust manifold may be designated as the exhaust side 307. The cylinder bank may be oriented such that the long axis of the cylinder bank is perpendicular to the longitudinal axis of the vehicle (it will be appreciated that this orientation may be referred to as an east-west or transverse conformation). In another example, the long axis of the cylinder bank may be parallel to the longitudinal axis of the vehicle (it will be appreciated that this orientation may be referred to as a north-south or longitudinal conformation).

The function of components such as alternator 305 function in the way currently described. Engine 10 may include a cylinder head 301 comprising a plurality of cylinders 30 when coupled to cylinder block 302. Cylinders 30 may be coupled to crankshaft 40, allowing the energy of combustion transmitted to reciprocating motion of pistons 36 to be translated into rotational motion of the crankshaft. Crankshaft 40 is contained within crankshaft housing 308, which includes routing for crankshaft 40. Crankshaft 40 may be coupled to drive pulley 327 such that rotational motion of crankshaft 40 may be translated to rotational motion of the drive pulley. The drive pulley may be coupled to one or more drive belts, one of which is drive belt 310. Drive belt 310 may also be coupled to alternator 305 by routing over an alternator pulley 303. The one or more additional drive belts (not shown) may be further coupled to additional pulleys and accessory devices mounted on or attached to FEAD structure. FEAD structure 200 may further include a crankshaft mount (not shown) for securing the bracket to crankshaft housing 308. In the present example, structure 200 is fastened directly to cylinder head 301. In another example, structure 200 may be coupled to engine 10 via the crankshaft mount, which may be secured to crankshaft housing 308. Although only alternator 305 is the only component shown in FIG. 2, it is understood additional peripheral components may be attached to structure 200 and driven by the one or more drive belts, the components may include a power steering pump, water pump, air pump, and a compressor.

As mentioned above, in the example depicted in FIG. 2, FEAD structure 200 may be coupled directly to cylinder head 301 through a plurality of mounting bolts and mounting bosses or other suitable fasteners. In another example, no mounting bolts or mounting bosses are used to directly couple bracket 200 to cylinder head 301, and instead, structure 200 may be coupled to engine 10 via a crankshaft mount (not shown), which may be secured to crankshaft housing 308.

The inventors herein have recognized that a bracket and related method for mounting a FEAD peripheral component on engine 10 may be utilized to protect an operator from unnecessary effort and enable a faster way to install the FEAD component.

Figure 3:
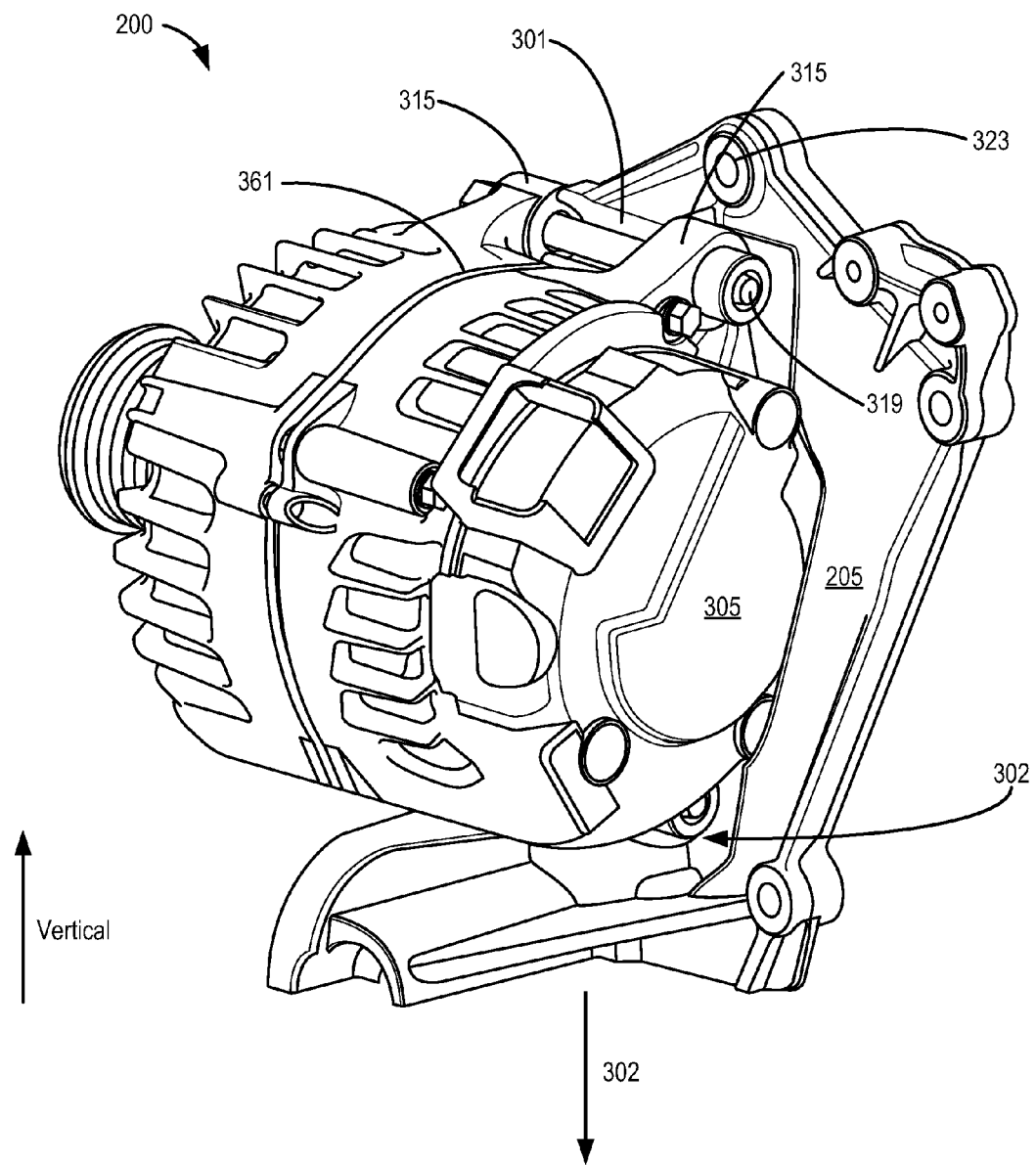
FIG. 3 illustrates an alternator mount with an alternator attached.

FIG. 3 depicts the presently disclosed bracket 301, which may also be referred to as the upper bracket due to its more vertical location compared to lower bracket 302 (partially visible in FIG. 3). It is noted that the vertical direction, as it is used throughout this description, lies opposite to the direction of gravity. In other words, the arrow shown in FIG. 3 illustrates the vertical direction, and the opposite direction is the direction that gravity acts towards. Furthermore, FEAD structure 200 is mounted in a vehicle that is on level ground, meaning the vertical direction is also a vertical direction of the vehicle. Also note that once FEAD structure 200 is attached to engine 10, the FEAD structure is part of the engine, and so are brackets 301 and 302 by extension.

Upper and lower brackets 301 and 302 are of different shapes as further detailed with regard to FIGS. 5 and 6. As seen, bracket 301 is attached to alternator mount 205. Likewise, bracket 302 is also attached to alternator mount 205. Alternator mount 205 is the upper portion of FEAD structure 200, and the lower portion (or rest) of structure 200 is cut from view in FIG. 3 in the direction shown by arrow 317. In the following descriptions, focus will be directed toward alternator mount 205, its related components, and alternator 305. Notice that alternator 305 is substantially cylindrical in shape as it is attached to mount 205. As described with regard to FIG. 2, FEAD structure 200 may be coupled directly to cylinder head 301 via mounting bolts and bosses. For this mounting method, a plurality of mounting holes 323 are positioned in mount 205 (of structure 200) for the purpose of fixing structure 200 to cylinder head 301.

Alternator 305 has a generally cylindrical shape with features and details not shown in alternator 305 of FIG. 3. The alternator has two upper flanges 315 attached to the outer surface of alternator 305, the upper flanges linearly separated by a distance. The two flanges contain holes that share a common central axis such that a bolt 319 (a first, upper bolt) can fit through both flanges. In a similar fashion, the two lower flanges 316 are located on a lower end of the alternator, near lower bracket 302 but not visible in FIG. 3. The two lower flanges 316 are identical to upper flanges 315 but are located on the lower side of the alternator, positioned for another bolt 320 (a second, lower bolt) to fit through the holes of flanges 316. Flanges 315 and 316 are generally triangular in shape as they protrude from alternator 305. Bolts 319 and 320 hold alternator 35 to alternator mount 205. As seen in FIG. 3, the shank or long portion of bolt 319 (or other connector type) spans a cavity in between flanges 315 and fits into bracket 301.

It is noted that bolts 319 and 320 may be general fasteners or connectors that are substantially cylindrical in shape and fit inside their respective flanges and holes of the alternator and alternator mount. For continuity, the term bolt is used hereafter, but it is understood that the bolts may be other types of connectors that serve the same purpose of securely joining multiple components together. As seen in FIG. 3, upper flanges 315 are located on either side of a central axis 361, which divides the cylinder of alternator 305 into two equal-length halves, which may be an upper and a lower half. Flanges 315 are both located equidistant from axis 361. Likewise, although not shown, the two lower flanges 316 are distanced in a similar fashion, that is, equidistant from axis 361.

FIG. 4 shows alternator mount 205 from a similar angle as in FIG. 3, but with alternator 305 removed for ease of viewing the other features. In this depiction, lower bracket 302 is fully visible as it is attached to alternator mount 205. Furthermore, alternator mount 205, particularly near upper bracket 301 and lower bracket 302, is curved so as to substantially match the contour of alternator 305. As previously mentioned, note that the shapes of brackets 301 and 302 are different, the differences explained later with regard to FIGS. 4 and 5.

It is understood that the size of upper and lower brackets 301 and 302 may differ in size than those shown in FIG. 4 as well as differ in size and shape from each other. The sizing may depend on the engine system and size of the component that is attached to the brackets. As an example, for use in a conventional gasoline internal combustion engine, the bolts and alternator would be selected for use with that engine. If a diesel engine was used, larger bolts and bracket components may need to be installed as diesel engines may produce more vibration than gasoline engines. The lager components may aid in the robustness and strength of the FEAD structure as well as improve the noise, vibration, and harshness (NVH) characteristics of the vehicle.

FIG. 5 depicts a closed bracket 502 which is the same as lower bracket 302 of FIG. 4 but fixed along the top of mount 205 instead of the bottom of mount 205 (as shown in FIG. 4). The shape of brackets 502 and 302 are identical while their positions and orientations on mount 205 is different. Any description of the geometrical features of bracket 502 may also be applied to bracket 302. Bracket 502 (and 302) is a closed bracket, in that it contains an open portion 514 and a closed portion 512. Open portion 514 assumes the shape of a shaft-wise opening, in that a shaft of shank of a bolt may fit into the option portion. The solid part of open portion 514 conforms to the shape of a semi-circular groove which is elongated along a horizontal direction 550. Closed portion 512 includes a semi-circular groove, but is completely enclosed rather than including a shaft-wise opening. From this geometry, a circular passage 516 is located inside the closed portion 512 to allow a bolt to pass through, such as bolt 319 of FIG. 3.

FIGS. 6A and 6B depict upper bracket 301 from two views, where the upper bracket is an open bracket. Bracket 301 is positioned along the top end of mount 205 the same as it is positioned in FIG. 4. As seen in FIG. 6A, similar to bracket 502, bracket 301 conforms to the shape of a semi-circular groove 645 which is elongated along a horizontal direction 650. In other words, bracket 301 comprises a semi-circular groove 645 and a shaft-wise opening 646. However, the entirety of the length of bracket 301 is open rather than partially closed as with bracket 502. Groove 645 of bracket 301 extends further in a vertical direction to form a lip 630, with the lip also extending throughout the entire length of the groove. Groove 645 contains an exterior surface 659 that defines the boundary between groove 645 and opening 646. Surface 659 extends along direction 550 and faces unobtrusively towards a space 661 around alternator mount 205. A first planar end face 671 defines a first end of bracket 301, while a second planar end face 672 defines a second end of bracket 301. Faces 671 and 672 are parallel to each other. As an alternator is mounted to bracket 301, nuts and/or washers of first bolt 319 may be in direct contact with faces 671 and 672, where compressive force may be applied to secure the alternator to the bracket and alternator mount.

FIG. 6B shows a front view of bracket 301, where the profile of semi-circular groove 645 is more clearly visible. As seen, one angular portion of the bracket is defined by the solid material of groove 645 while opening 646 defines the cutout of the bracket. It is noted that the addition of groove 645 and opening 646 forms a complete circle. In other words, if the shaft-wise opening contained solid material instead of defining the lack of material, the end of the bracket would be circular as seen from the front view of FIG. 6B. It is noted that the combination of the solid material of portion 645 and the cavity (lack of solid material) form the circular groove of bracket 301. The curvature of the groove is shaped to fit a bolt, such as bolt 319 of FIG. 3. Furthermore, opening 646 may be large enough so as to accommodate the diameter of a shank of a bolt. Opening 646 is positioned such that bolt 319 (or other fastener) is held inside the opening without the ability to slide out due to gravity and/or the non-vertical force of alternator 305 on the bolt. Due to the alternator hanging from the bolt via opening 646, both a horizontal and a vertical force may be exerted on the bolt such that the bolt is biased to move away from bracket 301. The angle of opening 646 as defined by the angle of lip 630 provides material that may be adjacent to the bolt and prevent the bolt (and alternator) from falling off bracket 301.

A tangential axis 680 that is tangential to the lower curvature of groove 645 and perpendicular to the vertical axis extends away from the groove as seen in FIG. 6B. Tangential axis 680 may be extended to form a horizontal plane 680 of FIG. 6A that is also perpendicular to the vertical axis and adjacent to the lower curvature of groove 645. Faces 671 and 672 are perpendicular to the horizontal plane defined by axis 680. Additionally, an angular axis 670 also extends away from the groove, where one end of axis 670 is coincident with one end of tangential axis 680. Angular axis 670 lines along the boundary between opening 646 and solid portion 645. In other words, axis 670 defines the end of lip 630 and the degree to which lip 630 is curved. Quantitatively, the degree of curvature or size of lip 630 may be defined by an angle 675 that spans the angle between tangential axis 680 and angular axis 670. In the present embodiment of bracket 301, angle 675 may be an acute angle, that is, less than 90 degrees but greater than 0 degrees. The acute angle of 675 that defines the angle of lip 630 may hold the alternator (or other auxiliary part) in opening 646 such that the alternator does not fall due to gravity, as described above. If angle 675 were greater than or equal to 90 degrees, opening 646 may be smaller than the diameter of the shank of the bolt, and thus prevent proper mounting of the alternator. If angle 675 were equal to or less than 0 degrees (sloping down), the bolt may slide out of opening 646 and the alternator may fall, potentially injuring the operator during installation of the alternator or causing other damage.

End face 671, as seen in FIG. 6B, provides a cross-section of bracket 301, and that cross-section remains constant in shape and size throughout the length of the bracket towards the second end face 672. End face 671 (and face 672) forms a circle of solid material that is never fully closed and remains continuously open throughout the length of the bracket. As described previously, this circular shape of end face 671 is defined by semi-circular groove 645 and opening 646. In total, there are three faces of bracket 301 that are in contact with space 661: end face 671, end face 672, and surface 659 (part of semi-circular groove 645).

Along with the brackets and mounting structure to fix peripheral components (such as alternators) to an engine, methods are needed for positioning and attaching those components. As described in the summary, other methods for mounting FEAD components involve a human operator supporting the weight of the component in one hand while manipulating fasteners with the other hand. This situation may be dangerous to the operator in the event the component is dropped, time inefficient for an assembly line, and difficult to the operator. The inventors herein have recognized that existing bracket designs and their associated methods for mounting components may not be conducive to assembly codes that require temporary retention features for safely attaching components, as previously described in the summary.

To elaborate, a component mount of a FEAD structure may utilize an upper and lower bracket for attaching to a component (an alternator in this case). An existing solution may involve the use of closed bracket 502 as both the upper and lower brackets. Bracket 502 may be a favorable device for holding an alternator due to the amount of surface area available on the outer face of closed portion 512. The surface area may allow for more clamping force to be applied to the bracket without risking fracturing the bracket. For this reason, this style of bracket may be used for both the upper and lower brackets in order to securely hole the alternator in place.

However, with two closed brackets 502, physically attaching the alternator may be difficult. With an alternator design with two flanges 315 as shown in FIG. 3, the alternator would first need to be lifted by the human operator and held near the upper bracket. Next, while holding the alternator with the holes of flanges 315 in-line with passage 516 of bracket 502 with one hand, the operator would need to insert a bolt with their other hand. Physically supporting the weight of the alternator while attempting to fix it in place may be difficult and dangerous for the operator.

It is noted that in other embodiments not shown or presently described, lower bracket 302 (of FIGS. 3 and 4) with the closed design as explained with regard to bracket 502 in FIG. 5 may be replaced with a second open bracket such as 301 shown in FIGS. 6A-6B. The integral feature of the current FEAD assembly is that the upper bracket features the open design to enable a safer assembly method, as later explained. As such, the lower bracket may have an open design 301 or closed design 502. Throughout this disclosure and associated figures, the lower bracket of alternator mount 205 will have the closed design 502.

As an alternative method to the mounting method presented with regard to U.S. Pat. No. 8,511,272 in the summary, the inventors have proposed a mounting method for use with bracket 301. In this method, the upper bracket is of the open design (301) and the lower bracket is of the closed design (302 or 502), as seen in FIG. 4. The mounting method is shown graphically in FIGS. 7A-7C. Note that alternator 305 is shown with a dashed line and transparent in order to better view mount 205 and other features such as brackets 301 and 302.

First, while the alternator is lying on a stable surface, the operator inserts a first bolt 319 through the two upper flanges of the alternator, where the bolt may be loosely tightened to ensure it does not fall out. Next, shown in FIG. 7A, the operator lifts the alternator with both hands and rests it on upper bracket 301. The operator may let go of the alternator because the angle of lip 630 may hold the alternator in the groove of bracket 301, allowing the alternator to hang from saddle created by the upper bracket. The alternator with bolt 319 installed may fit easily in bracket 301 if the bolt is loosely tightened but not tightly torqued.

Next, shown in FIG. 7B, the alternator is pivoted around its upper flanges 315 so that the holes of its lower flanges 316 are aligned with passage 516 of the lower bracket 302 (or 502). Since the first bolt 319 is already holding the alignment of upper flanges 315 and bracket 301, the alignment of the lower features may be accomplished by pivoting the alternator into place. At this point, a second bolt 320 may be inserted into the holes of flanges 316 and passage 516. Note that this step may be performed with both of the operator's hands while the weight of the alternator is securely supporting by engine 10.

Lastly, shown in FIG. 7C, bolts 319 and 320 hold alternator 305 in position but are loosely clamping the upper and lower flanges 315 and 316 to brackets 301 and 302, respectively. To ensure a substantially rigid connection between the alternator and alternator mount, bolts 319 and 320 are tightened to a pre-determined torque specification as required by the particular engine system. For example, both bolts may be tightened to a torque of 47.5 Nm. The alternator is positioned in place on mount 205 where it forms a substantially rigid connection with the mount such that the alternator exhibits little to no linear movement or rotation.

Figure 8:
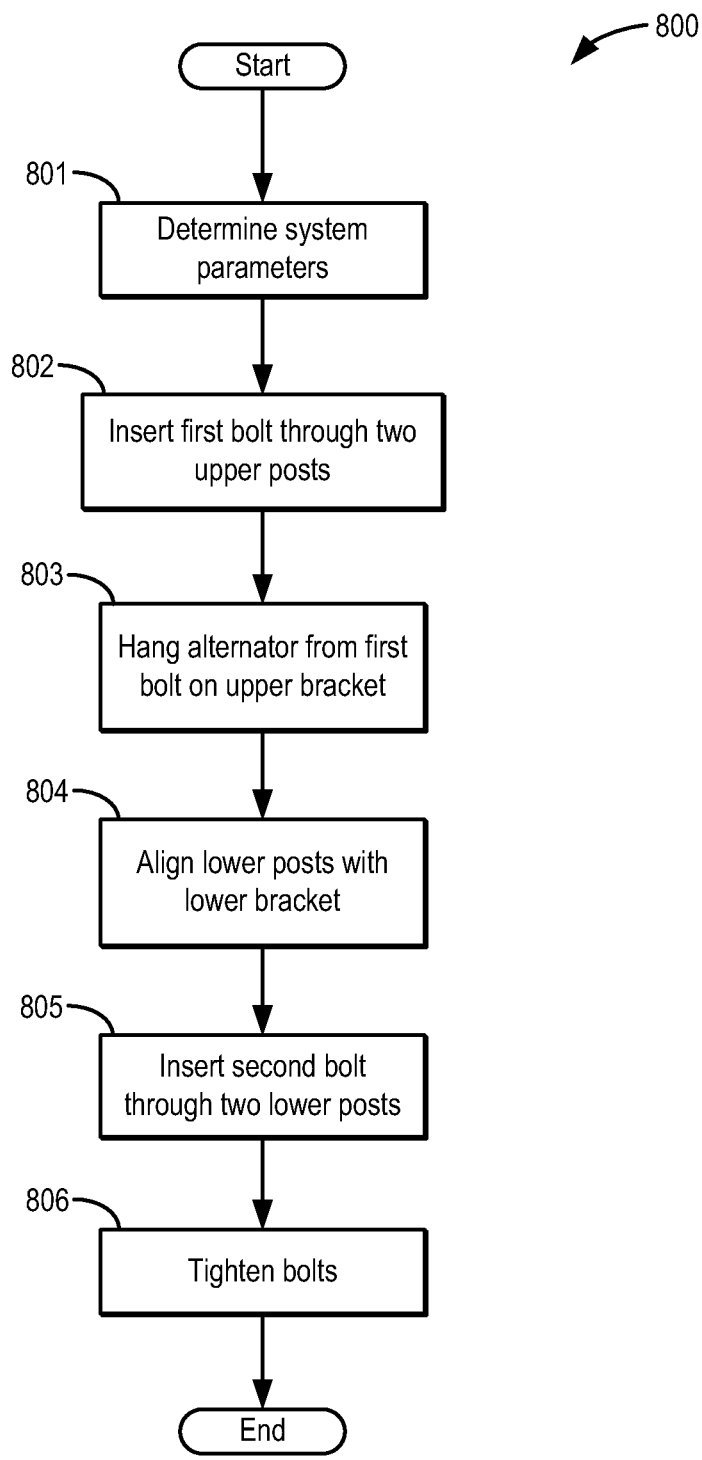
FIG. 8 shows a flow chart depicting a method for attaching an alternator on an alternator mount.

The method for mounting alternator 305 on mount 205 (part of FEAD structure 200) as explained with regard to FIGS. 7A-7C is depicted as a flow chart in FIG. 8. In reference to FIG. 8, a method 800 is presented for attaching alternator 305 to mount 205, the same method as graphically described in FIGS. 7A-7C.

In a first step at 801, a number of system parameters are determined. These parameters may include, but are not limited to, bolt type and size, torque requirements, and alternator weight. Second, at 802, as the alternator is lying in a stable position such as on a stand or the ground, a first bolt is inserted through the two upper flanges on the alternator. A nut and/or washer combination is screwed onto the stem of the bolt to loosely hold the bolt in place. Next, at 803, an operator lifts the alternator and places the shank of the bolt (that is in between the two upper flanges) on the groove formed by the upper bracket. The operator may then let go of the alternator, allowing the alternator to be suspended from the upper bracket and bolt. The lip of the groove may hold the alternator in place. Note that if the bolt is tightened above a threshold torque in step 802, then the shank of the bolt may not fit in the groove due to interference between the two upper flanges of the alternator and the ends of the upper bracket.

At this point, the alternator may be pivoted about the bolt allowing the operator to then rotate the alternator so that its lower flanges align with the lower bracket at 804. Since the alternator is designed to fit with the upper and lower brackets, alignment may be achieved as the alternator is rotated into place. After the holes are aligned, the operator may let go of the alternator and the alternator will stay in place due to gravity and the weight of the alternator being supported by the upper bracket. Afterwards, at 805, a second bolt is inserted through the two lower flanges of the alternator along with the circular passage of the lower bracket. Again, a nut and/or washer combination is screwed onto the stem of the bolt to ensure the bolt does not fall out. During this process, the operator may use both hands to manipulate the bolt and its components since the alternator is hanging in place. Finally, at 806, the first and second bolts are tightened to the predetermined torque (as may be defined at 801). Upon tightening, the alternator forms a substantially rigid connection with the upper and lower brackets as they are attached to the alternator mount.

By using the open bracket design of upper bracket 301, alternator 305 can be safely hung on bracket 301 while installing bolt 320 to lower bracket 302 (or 502). In this way, gravity may work in favor of the operator while installing the alternator on mount 205. Furthermore, the operator can drive fasteners to required tightness without holding the component in place. The open bracket provides lip 630 that is angled to hold the alternator (or other auxiliary component) in place via bolt 319, preventing the bolt from sliding out of bracket 301. Overall, the open bracket design utilized as the upper bracket and related mounting methods may be advantageous over current mounting brackets and systems.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine-mounting system, comprising:
a component with two upper flanges and two lower flanges;
a mounting structure comprising an upper bracket, the upper bracket comprising a semi-circular groove and a shaft-wise opening, the groove including a lip that is acutely angled away from a horizontal plane defined by a lower edge of the groove, the mounting structure further comprising a lower bracket, located vertically below the upper bracket, the lower bracket comprising a semi-circular groove and a shaft-wise opening with a closed portion;
a first connector inserted through the two upper flanges, a shank of the first connector configured to be placed in the groove of the upper bracket, after the first connector is inserted through the two upper flanges, to hang the component from the upper bracket, the shank held in place in the groove of the upper bracket by the angle of the lip; and
a second connector configured to be inserted through the two lower flanges and the lower bracket while the first connector is hanging from the upper bracket.

2. The system of claim 1, wherein the component is an alternator, pump, compressor, or other auxiliary engine component, and where the engine is mounted in an on-the-road vehicle.

3. The system of claim 1, wherein the first and second connectors are bolts.

4. The system of claim 1, wherein the lip of the upper bracket is adjacent to the shank of the first connector and prevents the first connector from sliding off the upper bracket.

5. The system of claim 1, wherein the upper bracket contains two planar end faces that are perpendicular to the horizontal plane of the upper bracket.

6. The system of claim 1, wherein the lower bracket contains two planar end faces that are perpendicular to the horizontal plane defined by the lower edge of the semi-circular groove of the lower bracket.

7. The system of claim 1, wherein the semi-circular grooves of the upper and lower brackets are contoured to fit a profile of the first and second connectors, respectively.

8. A method for mounting a component to an engine, comprising:
inserting a first bolt through two upper flanges on the component;
hanging the first bolt attached to the component on an upper bracket mounted to the engine by placing a shank of the first bolt into a curved portion of the upper bracket, where a lip formed at a lower edge of the curved portion is acutely angled away from a horizontal plane defined by the lower edge of the curved portion, thereby preventing the first bolt from sliding off the upper bracket;
pivoting the component to align with a lower bracket mounted to the engine; and
inserting a second bolt through two lower flanges on the component.

9. The method of claim 8, wherein the component is an alternator, pump, compressor, or other auxiliary engine component.

10. The method of claim 8, wherein the upper bracket bears the weight of the component via the first bolt prior to inserting the second bolt.

11. The method of claim 8, wherein a human operator does not support the weight of the component while simultaneously inserting the first or second bolts.

12. The method of claim 8, further comprising tightening the first and second bolts to a torque specification.

13. A structure for mounting an engine auxiliary part on an engine, comprising:
an upper bracket comprising a semi-circular circular groove elongated along a horizontal direction, the groove forming a shaft-wise opening along an entirety of a length of the upper bracket and having a cross-section with a constant shape and size along the length of the upper bracket; and
a lip formed at a lower edge of the groove, the lip acutely angled away from a horizontal plane defined by the lower edge of the groove,
wherein the groove is configured to receive a shank of a connector attached to the engine auxiliary part to hang the engine auxiliary part from the upper bracket, with the shank held in place in the groove by the angle of the lip.

14. The structure of claim 13, wherein the opening is sized to accommodate the connector.

15. The structure of claim 13, wherein an addition of the semi-circular groove and the shaft-wise opening forms a complete circular structure.

16. The structure of claim 13, wherein the connector is attached to the engine auxiliary part via two flanges of the engine auxiliary part separated by a cavity, the cavity consumed by the shank of the connector that fits into the semi-circular groove.

17. The structure of claim 13, wherein the lip is adjacent to the connector and prevents the connector from sliding out of the upper bracket in a horizontal direction.

18. The structure of claim 13, further comprising two planar end faces that are perpendicular to the horizontal plane.

19. The structure of claim 18, wherein the two end faces are in direct contact with the connector.

\* \* \* \* \*

UNITED STATES PATENT AND TRADEMARK OFFICE
CERTIFICATE OF CORRECTION

PATENT NO. : 9,296,296 B2
APPLICATION NO. : 14/198134
DATED : March 29, 2016
INVENTOR(S) : James Parsons Sullivan et al.

It is certified that error appears in the above-identified patent and that said Letters Patent is hereby corrected as shown below:

In the claims, column 12, line 29, delete "circular".

Signed and Sealed this
Twenty-first Day of June, 2016

Michelle K. Lee
*Director of the United States Patent and Trademark Office*